United States Patent
Hunstable (10) Patent No.: US 9,325,232 B1
(45) Date of Patent: Apr. 26, 2016

(54) METHOD AND APPARATUS FOR POWER GENERATION

(75) Inventor: Fred E. Hunstable, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 1146 days.

(21) Appl. No.: 13/185,109

(22) Filed: Jul. 18, 2011

Related U.S. Application Data (60) Provisional application No. 61/366,715, filed on Jul. 22, 2010.

(51) Int. Cl.
*H02K 35/04* (2006.01)
*H02K 7/075* (2006.01)

(52) U.S. Cl.
CPC .............. *H02K 35/04* (2013.01); *H02K 7/075* (2013.01)

(58) Field of Classification Search
CPC .............................. H02K 35/04; H02K 7/075
USPC ................ 310/13, 12.01–12.33, 14, 15, 36
See application file for complete search history.

(56) References Cited

U.S. PATENT DOCUMENTS

| | | |
|---|---|---|
| 1,349,100 A | 8/1920 | Reynolds et al. |
| 3,135,880 A | 6/1964 | Olson |
| 3,656,015 A | 4/1972 | Gillum |
| 3,666,977 A | 5/1972 | Helms |
| 3,740,594 A | 6/1973 | Casey |
| 3,751,693 A | 8/1973 | Gabor |
| 3,939,367 A | 2/1976 | Ramirez |
| 3,949,249 A | 4/1976 | Wiseley et al. |
| 3,984,706 A | 10/1976 | Inouye |
| 4,217,507 A | 8/1980 | Jaffe |
| 4,243,899 A | 1/1981 | Jaffe |
| 4,317,058 A | 2/1982 | Blalock |
| 4,318,038 A * | 3/1982 | Munehiro ................ 318/135 |
| 4,415,821 A | 11/1983 | Wedman |
| 4,445,798 A | 5/1984 | Munehiro |
| 4,518,882 A | 5/1985 | Morino |
| 4,785,210 A | 11/1988 | Maruyama |
| 4,845,392 A | 7/1989 | Mumbower |
| 4,858,452 A | 8/1989 | Ibrahim |

(Continued)

FOREIGN PATENT DOCUMENTS

| | | |
|---|---|---|
| DE | 19839464 A1 | 3/2000 |
| DE | 202007001534 U1 | 4/2007 |

(Continued)

OTHER PUBLICATIONS

International Search Report and Written Opinion received in Patent Cooperation Treaty Application No. PCT/US2011/057318, dated Jan. 25, 2012, 11 pages.

(Continued)

*Primary Examiner* — Dang Le
*Assistant Examiner* — Leda Pham
(74) *Attorney, Agent, or Firm* — Bill R. Naifeh (57) ABSTRACT

Embodiments of an electrical power generation device and methods of generating power are disclosed. One such method comprises creating magnetic flux forces generally transverse to a face of a magnet facing a center of a cylinder, moving a coil of wound conductive material partially through the center opening of the cylinder to produce the electric current and, routing resistive forces generated from the moving coil through an iron core, wherein the first coil is positioned concentrically about a first portion of the core, and further routing the resistive forces around the cylinder.

13 Claims, 7 Drawing Sheets

(56) References Cited

U.S. PATENT DOCUMENTS

| | | | |
|---|---|---|---|
| 5,177,383 A | 1/1993 | Sim | |
| 5,220,223 A | 6/1993 | Mehnert | |
| 5,231,336 A | 7/1993 | van Namen | |
| 5,434,458 A | 7/1995 | Stuart et al. | |
| 5,440,183 A * | 8/1995 | Denne | 310/12.26 |
| 5,539,262 A | 7/1996 | Strugach | |
| 5,631,505 A | 5/1997 | Stephany | |
| 5,757,093 A | 5/1998 | Susliaev et al. | |
| 5,777,403 A | 7/1998 | Yuan | |
| 5,808,379 A | 9/1998 | Zhao | |
| 5,818,131 A | 10/1998 | Zhang | |
| 6,049,146 A | 4/2000 | Takara | |
| 6,066,998 A | 5/2000 | Trumper | |
| 6,075,297 A | 6/2000 | Izawa et al. | |
| 6,097,125 A | 8/2000 | Park | |
| 6,163,091 A * | 12/2000 | Wasson et al. | 310/12.19 |
| 6,242,823 B1 * | 6/2001 | Griswold | 310/30 |
| 6,278,204 B1 | 8/2001 | Frenette | |
| 6,365,993 B1 | 4/2002 | Calhoun | |
| 6,952,060 B2 | 10/2005 | Goldner et al. | |
| 7,078,833 B2 | 7/2006 | Xu | |
| 7,276,820 B2 | 10/2007 | Tang et al. | |
| 7,288,862 B2 | 10/2007 | Song | |
| 7,439,640 B2 | 10/2008 | Takeuchi | |
| 7,476,991 B2 | 1/2009 | Chang | |
| 7,501,724 B2 | 3/2009 | Tang et al. | |
| 7,528,561 B2 | 5/2009 | Kawai | |
| 7,579,722 B1 | 8/2009 | Borchert | |
| 8,110,950 B2 | 2/2012 | Moriyama et al. | |
| 8,922,070 B2 | 12/2014 | Hunstable | |
| 2001/0007400 A1 | 7/2001 | Griswold | |
| 2003/0102723 A1 | 6/2003 | Korenaga | |
| 2004/0155536 A1 | 8/2004 | Cordiale et al. | |
| 2004/0239199 A1 | 12/2004 | Qu | |
| 2004/0245861 A1 | 12/2004 | Miyajima et al. | |
| 2006/0055251 A1 * | 3/2006 | Hsian | 310/12 |
| 2006/0261680 A1 | 11/2006 | Moon | |
| 2008/0308199 A1 | 12/2008 | Locker | |
| 2010/0001592 A1 | 1/2010 | Kawano et al. | |
| 2012/0098357 A1 | 4/2012 | Hunstable | |
| 2013/0026279 A1 | 1/2013 | Agrikli | |

FOREIGN PATENT DOCUMENTS

| | | |
|---|---|---|
| EP | 0566959 A1 | 10/1993 |
| GB | 2286928 A | 8/1995 |
| JP | 58204761 | 6/1986 |
| JP | H0918992 A | 1/1997 |
| JP | 2000152558 A | 5/2000 |
| KR | 100770590 B1 | 10/2007 |
| WO | 0046910 A1 | 8/2000 |

OTHER PUBLICATIONS

International Search Report and Written Opinion received in Patent Cooperation Treaty Application No. PCT/US2013/057888, dated Jan. 17, 2014, 15 pages.

Office Action and translation received in Chinese Application No. 201180058326.4, dated Mar. 4, 2015, 18 pages.

Office Action received in European Application No. 11776307.8 dated Jun. 16, 2014, 4 pages.

Australian Office Action received in Australian Patent Application No. 2011316872 dated Jul. 27, 2015, 4 pages.

Chinese Second Office Action received in Chinese Patent Application No. 201180058326.4 dated Oct. 28, 2015, 10 pages.

European Office Action received in European Patent Application No. 11776307.8 dated Sep. 18, 2015, 4 pages.

European Office Action received in European Patent Application No. 11776307.8 dated Feb. 2, 2015, 5 pages.

Mexican Office Action received in Mexican Patent Application No. 18182 dated Apr. 23, 2014, 4 pages.

* cited by examiner

METHOD AND APPARATUS FOR POWER GENERATION

CROSS REFERENCE TO RELATED APPLICATIONS

This application claims the benefit of the filing date of U.S. provisional patent application Ser. No. 61/366,715, entitled a Method of Electrical Power Generation, filed on Jul. 22, 2010, the disclosure of which is incorporated herein by reference.

TECHNICAL FIELD

The invention relates in general to power generation methods, and in particular to an improved method for generating electrical power using linear power generators.

BACKGROUND INFORMATION

Generators are based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. Typically, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary component is called the stator.

Linear generators, in contrast, usually have a magnetic core moving through coils of wire. As the magnetic core passes through the coils, electrical current is produced. In this situation, the magnetic core is the armature because it moves relative to the coils, which are now called the stators.

Typically, some energy source is used to provide power to move the armature with respect to the stator. Typical sources of mechanical power are a reciprocating or turbine steam engine, water falling through a turbine or waterwheel, an internal combustion engine, a wind turbine, or even a hand crank.

As the energy sources for the country and the world grow more scarce, there is a need for more efficient methods and mechanisms for producing electric power. Furthermore, not all sources of mechanical power are readily available in all areas of the world, so there is also a need for methods and mechanisms that produce electrical power from readily-obtainable power sources such as wind and waves.

SUMMARY

In response to these and other problems, there is presented a method and apparatus of efficiently and conveniently producing an electric current. In one embodiment, the method comprises creating magnetic flux forces generally transverse to a face of a magnet facing a center of a cylinder, moving a coil of wound conductive material partially through the center opening of the cylinder to produce the electric current and, routing resistive forces generated from the moving coil through an iron core, wherein the first coil is positioned concentrically about a first portion of the core, and further routing the resistive forces around the cylinder.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

FIG. 1b is a top view of magnetic disc which could be used in the electric power system illustrated in FIG. 1a.

FIG. 1c is a conceptualized detail illustration of a coupling system between a portion of the coils and commutator segments which may be used in the electric power system of FIG. 1a.

FIG. 1d is conceptualized detail illustration of another embodiment of a coupling system between a portion of the coils and commutator segments which may be used in the electric power system of FIG. 1a.

FIG. 2a is a schematic section view of the magnetic cylinder which could be used in the power system of FIG. 1a.

DETAILED DESCRIPTION

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counter-clockwise, are discussed in this disclosure, such directions are meant to only supply reference directions for the illustrated figures and for orientated of components in the figures. The directions should not be read to imply actual directions used in any resulting invention or actual use. Under no circumstances, should such directions be read to limit or impart any meaning into the claims.

Figure 1A:
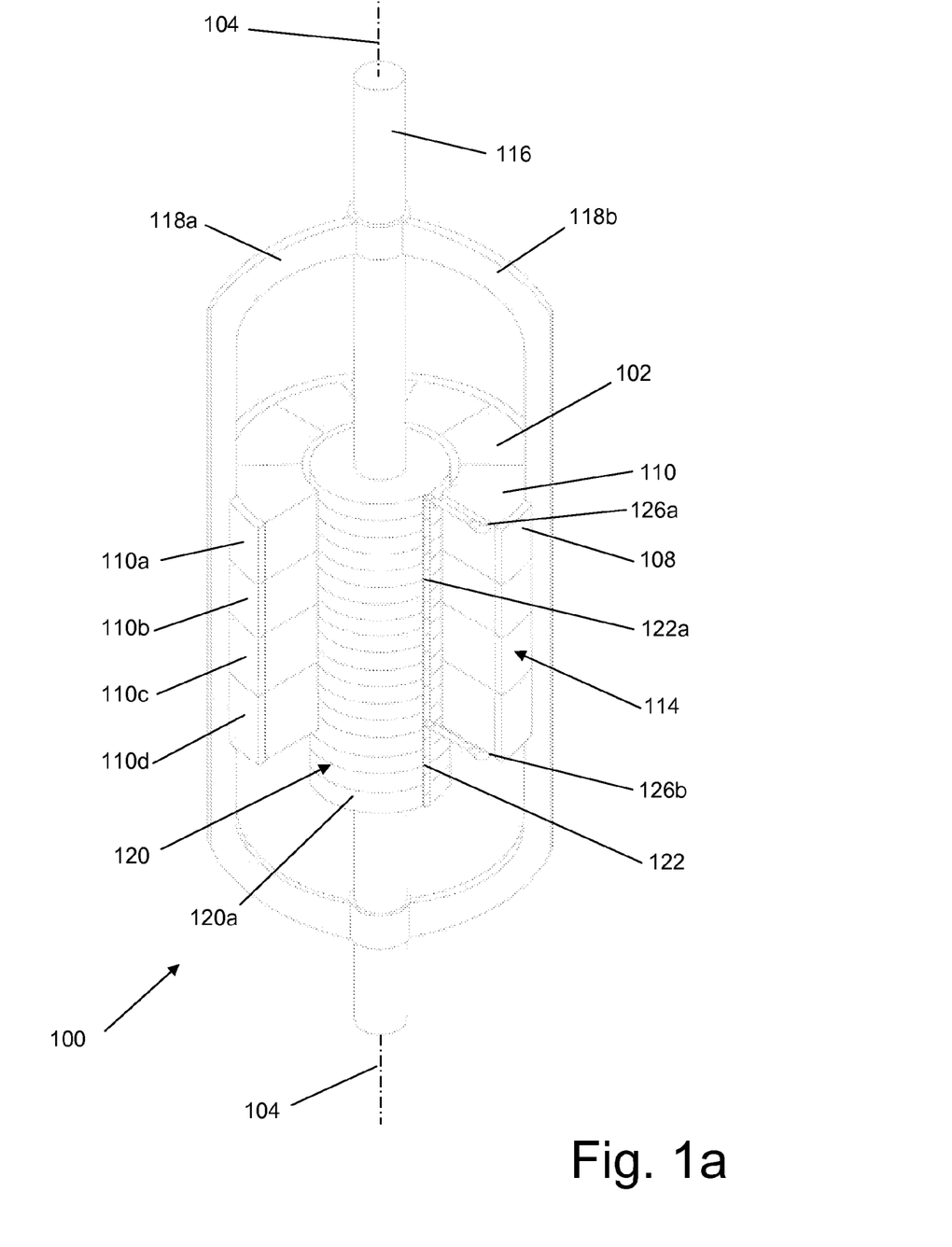
FIG. 1a is a partial sectional isometric drawing of one embodiment of an electric power system.

Turning now to FIG. 1a, there is presented a partial sectional isometric drawing of one embodiment of an electric power system 100, such as an electric power generator or electric motor. In the illustrated embodiment, there is a plurality of permanent magnets 102 or permanent magnetic devices radially arranged about a longitudinal axis 104. The plurality of magnets are positioned within an exterior retaining ring 108. The retaining ring 108 is structurally sufficient to overcome the magnetic repulsive forces of the magnetic devices and maintain the radial arrangement of the magnets 102. The retaining ring 108 may be formed from a variety of materials. In the illustrative embodiment, the retaining ring 108 is formed from iron or a relatively soft iron alloy. In other embodiments, they may be formed from non-ferrous metal if structural strength is the primary consideration for the use of the retaining ring. The combination of the plurality of radially aligned magnets 102, and the exterior retaining ring 108 forms a magnetic disc 110 (which is partially cut in FIG. 1a to show other details of the system 100).

Figure 1B:
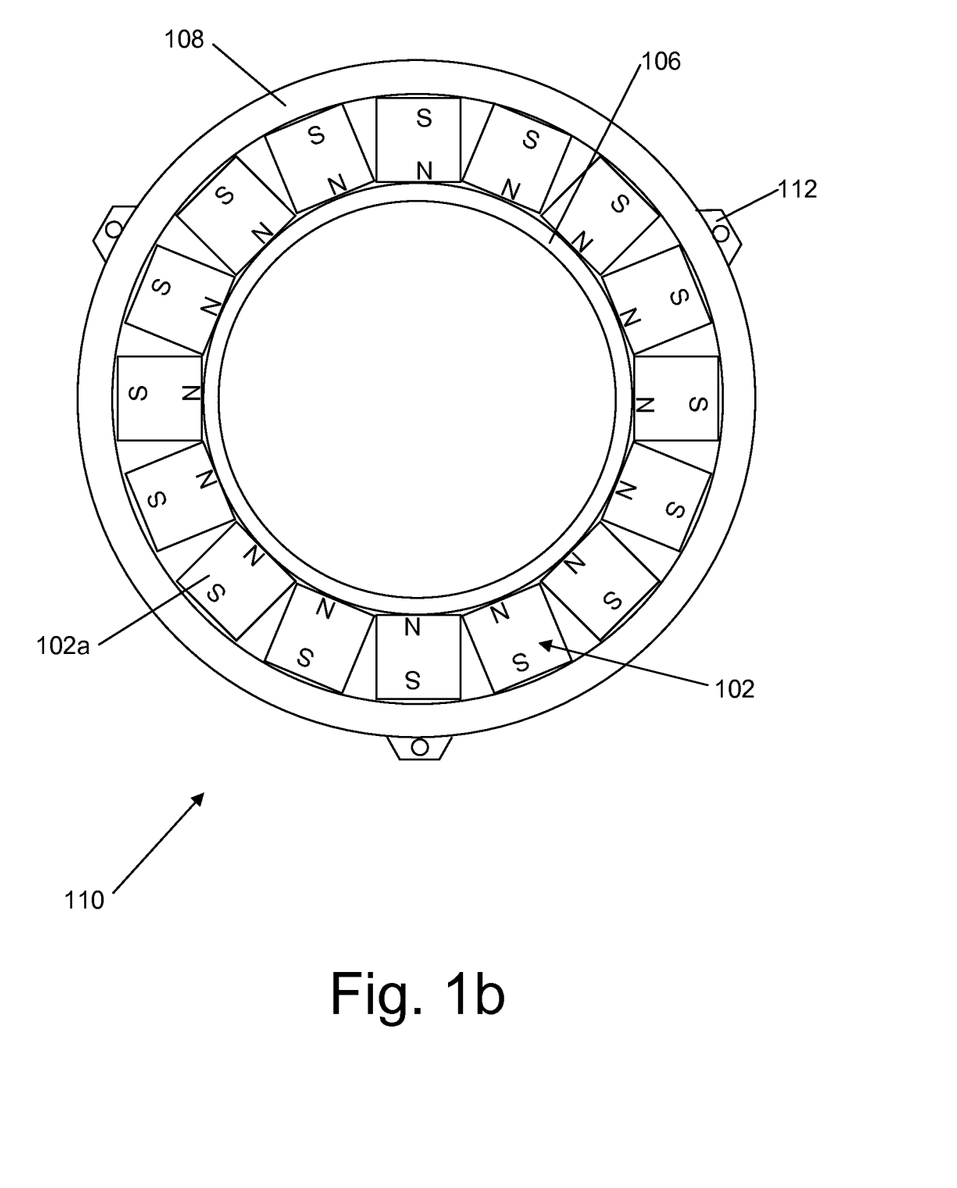

FIG. 1b illustrates a top view of one embodiment of the magnetic disc 110 which may be used by the system 100. FIG. 1b illustrates the outer retaining ring 108, and the plurality of magnets 102 arranged in a radial or circular pattern. In this illustration, an inner retaining ring 106 is also positioned about the longitudinal axis 104. The inner retaining ring 106 may be formed from iron and may be added to strengthen the magnetic flux strength of the system or for additional structural stability.

In the illustrated embodiment, each individual magnet of the plurality of magnets 102, for instance magnet 102a is orientated such that a magnetic pole faces inward towards the longitudinal or center axis of the magnetic disc 110. Consequently, the opposing pole faces outward from the center of the magnetic disc 110. By way of example, the magnets 102a each have their north poles facing inward and their south poles facing outward. In certain embodiments, the magnets 102a may be made of out any suitable magnetic material, such as: neodymium, Alnico alloys, ceramic permanent magnets, or even electromagnets.

The individual magnets 102a are held in place by an appropriate securement method known in the art, such as casting the magnets in resin, epoxying the magnets to a substrate, or by securing the magnets with mechanical fasteners. In certain embodiments, fastening features 112, such as screw holes, threaded studs, or interlocking rings are formed on the exterior of the outer retaining ring 108 to allow the magnetic disc 110 to be fastened to other magnetic discs or a support structure (not shown).

Turning back to FIG. 1a, there is shown a plurality of modular magnetic discs 110a-110d which forms a magnetic cylinder 114 (a portion of which is cut away in FIG. 1a). Although four magnetic discs 110a-110d are illustrated, depending on the required magnetic flux field strength of the magnetic cylinder 114, any number of magnetic discs could be used to assemble the magnetic cylinder 114. The power system 100 is modular in this respect and multiple magnetic discs 110 may be added to meet specific requirements.

In other embodiments, the magnetic cylinder 114 may comprise a single inner confinement ring, a single outer confinement ring, and predetermined number of rows of the plurality of magnets 102 positioned in a radial manner.

When incorporated into the system 100, the magnetic cylinder 114 is concentrically centered about a core 116 having the same longitudinal axis 104 as the magnetic cylinder 114. In certain embodiments, the core 114 is elongated and rod-like in shape. The core 114 may be made from iron or a ferrite compound with similar magnetic properties. As will be explained in greater detail below, the core 116 becomes a carrier for some of the counter emf flux generated during the power generation process.

In the illustrated embodiment, a plurality of yolks 118a-118c (yolk 118c is not visible in FIG. 1a) are coupled to the core 116 at each end such that the yolks surround the magnetic cylinder 114. In certain embodiments, the yolks 118a-118c may be coupled to the magnetic cylinder 114 and provide structural support for the magnetic cylinder. As will be explained in greater detail below, the yolks 118a-118c and the core 116 together create a carrier for counter emf forces to be routed away from the power generation area inside the magnetic cylinder 114. In certain embodiments, there may be just one yolk. In other embodiments, the casing itself may serve as a yolk and/or structural support. In other embodiments, there may be several yolks depending on the amount of emf forces to be carried. Furthermore, the yolks 118a-118c may serve the dual function for providing structural support for an enclosure (not shown). The yolks 118a-118c may be formed from iron, a ferrite compound or an alloy having similar magnetic properties.

Surrounding a portion of the core 116 is a plurality of coils forming a coil assembly 120. Each individual coil 120a in the coil assembly is made from a conductive material, such as copper (or a similar alloy) wire and is constructed using conventional winding techniques known in the art. In certain embodiments, the individual coils 120a are essentially cylindrical in shape being wound around a coil core (not shown) having a center opening sized to allow the coils to freely travel longitudinally along the core 116. In certain embodiments, the coil core may be made from a Teflon, Teflon laminate, bakelight, or other suitable material to allow the coil to travel longitudinally along the a stationary core 116.

Although a particular number of coils 120a are illustrated in FIG. 1a, depending on the power requirements, any number of coils could be used to assemble the coil assembly 120. The system is modular in this respect and individual coils may be added to the system to meet specific power requirements.

In certain embodiments, the conductors or wires (not shown) in each of the coils 120a terminate into separate commutator segments, for instance one conductor terminates into commutator segment 122a. The commutator segments may be formed from a material designed to produce minimal friction and low resistance, for instance a conductive copper alloy. The combination of commutator segments and coils allow the coils to be connected in series through the commutator segments. In yet other embodiments, current may be transferred through the use of flexible conductors.

Figure 1C:
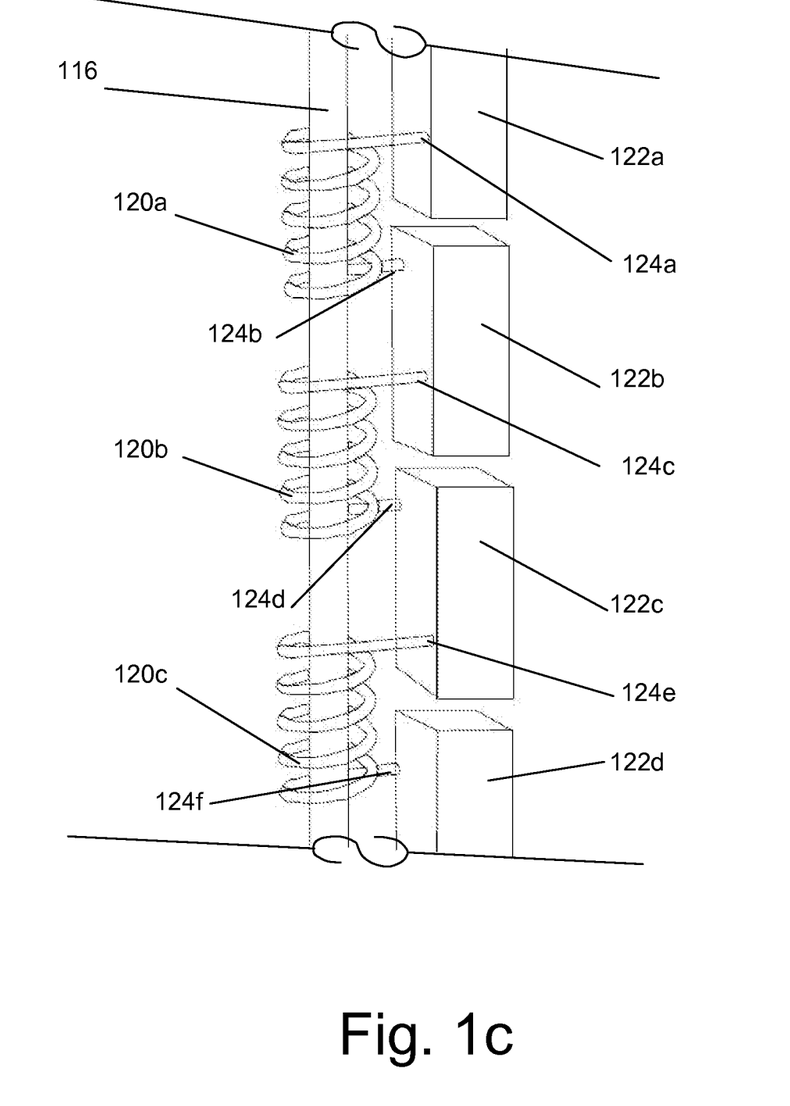

FIG. 1c is a conceptualized illustration of the electrical communication between a portion of the coils and commutator segments. In this figure, three individual coils 120a-120c are shown wound around a portion of the core 116. Each end of the coils is coupled to a commutator segment. For instance the first or upper end 124a of the coil 120a is coupled to the commutator segment 122a. The second or lower end 124b of the coil 120a is coupled to the commutator segment 122b. Similarly, the first or upper end 124c of the coil 120b is coupled to the commutator segment 122b and the lower end 124d is coupled to the commutator segment 122c. Similarly, the first or upper end 124e of the coil 120c is coupled to the commutator segment 122c and the lower end 124f is coupled to the commutator segment 122d. Thus, it can be seen that the commutator segments 122a-122d electrically connect the coils 120a-120c in series to each other. In certain embodiments, there are parallel coil coupling combined with switching circuitry (not shown) which selectively utilizes individual coils within the coil assembly 120. Selective utilization allows the effective removal of coils that are not actively producing power resulting in more efficient operation.

In embodiments where the coils are modular or "stackable," each commutator segment, such as the commutator segment 122b of FIG. 1c, would actually be split into two commutator segments which would electrically couple together when the respective coils are assembled to form the coil assembly 120. Such an embodiment is illustrated in FIG. 1d.

Figure 1D:
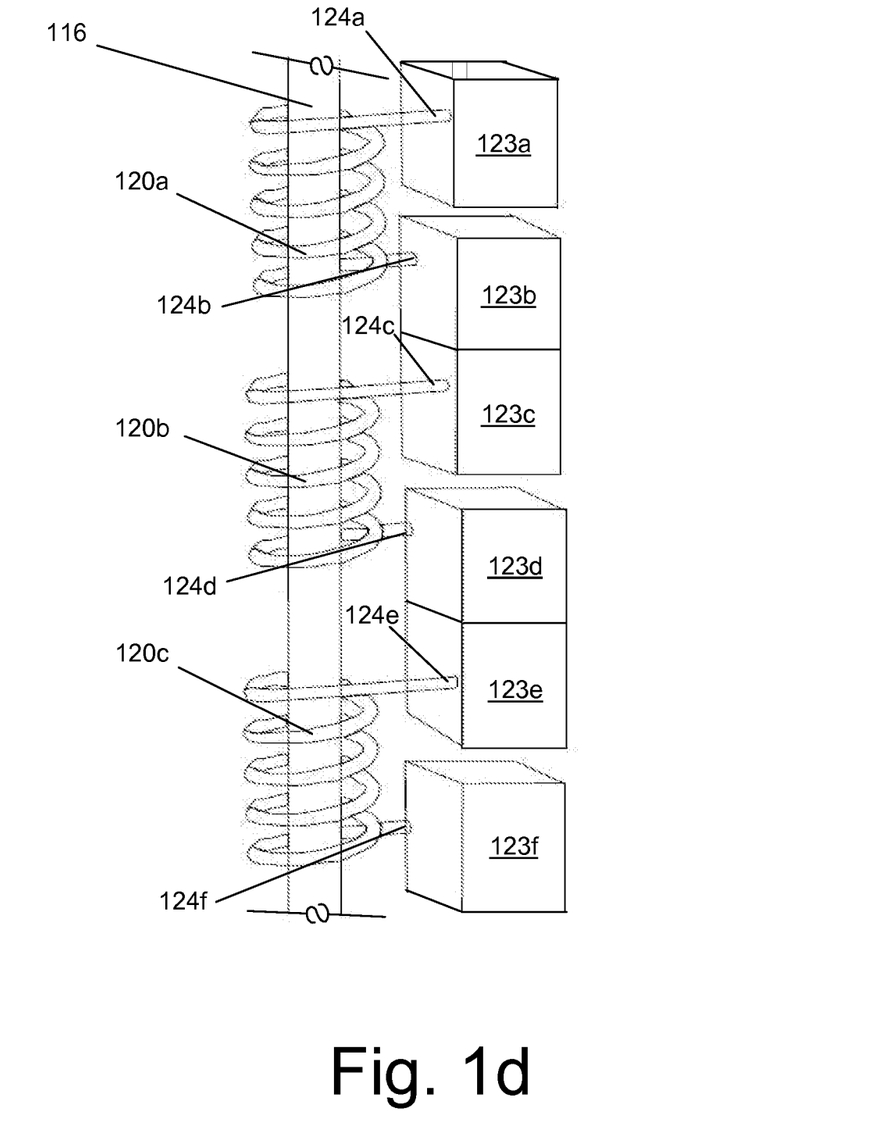

In FIG. 1d, the three individual coils 120a-120c are shown wound around a portion of the core 116. As opposed to the embodiment illustrated in FIG. 1c, each termination end of the coils is coupled to a separate commutator segment. For instance the first or upper end 124a of the coil 120a is coupled to the commutator segment 123a. The second or lower end 124b of the coil 120a is coupled to the commutator segment 123b. Similarly, the first or upper end 124c of the coil 120b is coupled to the commutator segment 123c and the lower end 124d is coupled to the commutator segment 123d, etc.

As illustrated, the commutator segment 123b is electrically coupled to commutator segment 123c. Similarly, commutator segment 123d is electrically coupled to commutator segment 123e. Thus, when the coils 120a-120c are assembled into a coil assembly, it can be seen that the commutator segments 122a-122f electrically connect the coils 120a-120c in series to each other.

Turning back to FIG. 1a, it can be seen that when the coil assembly 120 is assembled, the plurality of commutator segments, such as commutator segment 122a may be linearly aligned to from a commutator assembly 122. Consequently, each commutator segment 122a is electrically coupled to the commutator segment adjacent to it so that electric current flows between the commutator segments.

The commutator assembly 122 is in electrical communication with a plurality of brushes 126a-126b. The brushes 126a and 126b are electrically coupled to conductors (not shown) which allow electrical current to flow into or out of the coil assembly 120. Although two brushes 126a and 126b are shown in FIG. 1a, other embodiments, may have any number of brushes positioned anywhere along the commutator assembly 122.

The permanent magnets 112a generate magnetic forces which can be visualized as magnetic flux lines. When the permanent magnets 112a are arranged into a circular pattern as illustrated in FIG. 1b, the flux lines will form particular patterns. The shape, direction, and orientation of the flux lines depend on factors such as the use of an interior retaining ring, or the use of ferrous or non ferrous metallic end plate, or an end plate consisting of magnetic assemblies oriented to force the lines of flux out of one end of the magnetic cylinder.

Figure 2A:
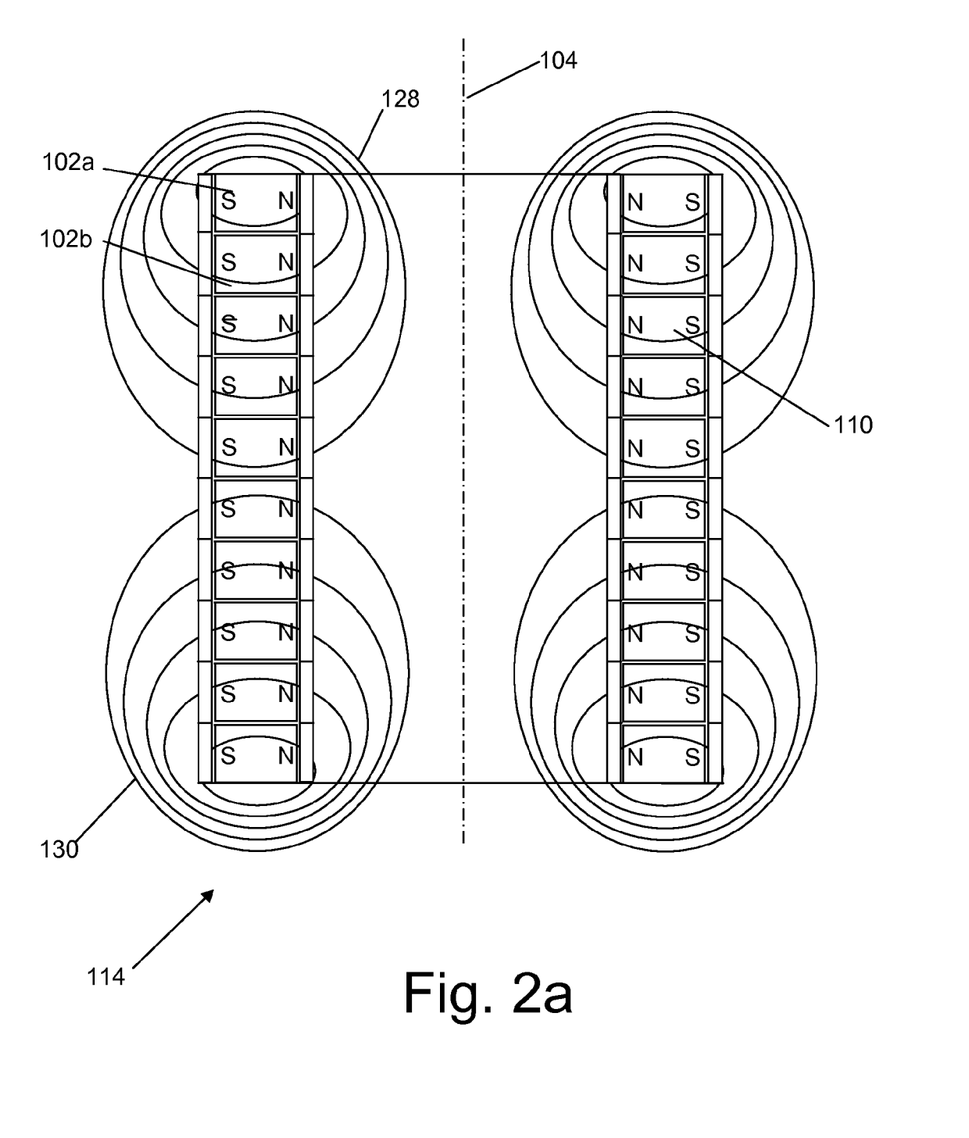

FIG. 2a is a schematic section view of the magnetic cylinder 114. As explained above, the magnetic cylinder 114 comprises a plurality of individual stacked magnetic discs, such as 10 magnetic discs 110 of FIG. 1b. Each magnetic disc 110 comprises a plurality of magnets radially arranged about an axis 104 as illustrated in FIG. 1b and FIG. 2a. In this configuration, the magnetic flux forces will tend to develop a stacking effect and will split into groups of similar orientation. For instance, the magnetic flux forces or lines generated by the magnet 102a tends to exit its interior face (or its north pole), circle around the top end (or closest end) of the cylinder 114 and return to the south pole or exterior face of the magnet 102a. In FIG. 2a, the magnetic flux forces are illustrated by the elliptical lines 128 which are meant to conceptually illustrate the magnetic flux forces and are not meant to be an actual depiction of the flux forces.

Similarly, the magnetic flux forces generated by magnet 102b tends to exit its interior face (or its north pole), circle around the top end of the cylinder 114 and return to the south pole or exterior face of the magnet 102a. The magnetic flux forces tend to follow this pattern for each successive disc until the longitudinal halfway point of the magnetic cylinder 114 is reached.

At that point around the longitudinal middle of the cylinder, the magnetic flux forces for each successive magnet will change its direction and exit its interior face (or its north pole), circle around the bottom end (i.e., the closest end) of the cylinder 114 and return to the south pole or exterior face of the respective magnet. Thus, the flux produced by the magnets have an unobstructed path to exit through the center of the cylinder 114 and return to its opposing pole on the exterior of the cylinder.

The individual magnetic discs 110 can be coupled together to produce a field flux strength that is appropriate for the power rating of the system. The field flux strength and power rating are based on conventional factors, such as Gauss strength, turns and size of coil conductors and speed at which core is moved.

In conventional power generators, the poles of the magnets are usually aligned longitudinally. In a conventional configuration, the field flux lines will "hug" or closely follow the surface of the magnets. Thus, when using conventional power generating equipment, the clearances must be extremely tight in order to be able to act on these lines of force. By aligning the poles radially towards the center of the cylinder, the magnetic flux lines tend to stack up as they pass through the center of the magnetic cylinder 4 and radiate perpendicularly from the surface of the magnets. This allows for greater tolerances between the coils (not shown) and the magnetic cylinder 114.

Thus, arranging the magnetic discs in this manner creates a first stacked plurality of magnetic flux forces 128 about a first or top portion of the magnetic cylinder 114 such that each magnetic flux force travels between a first pole of an inward face of magnet of the magnetic cylinder, around a first or top end of the magnetic cylinder 114, and back to a second pole of an exterior face of the magnet. This arrangement also creates a second stacked plurality of magnetic flux forces 130 about a second portion of the magnetic cylinder 114 such that each magnetic flux force travels between a first pole of an inward face of magnet of the magnetic cylinder, around a second or bottom end of the magnetic cylinder, and back to a second pole of an exterior face of the magnet.

Figure 2B:
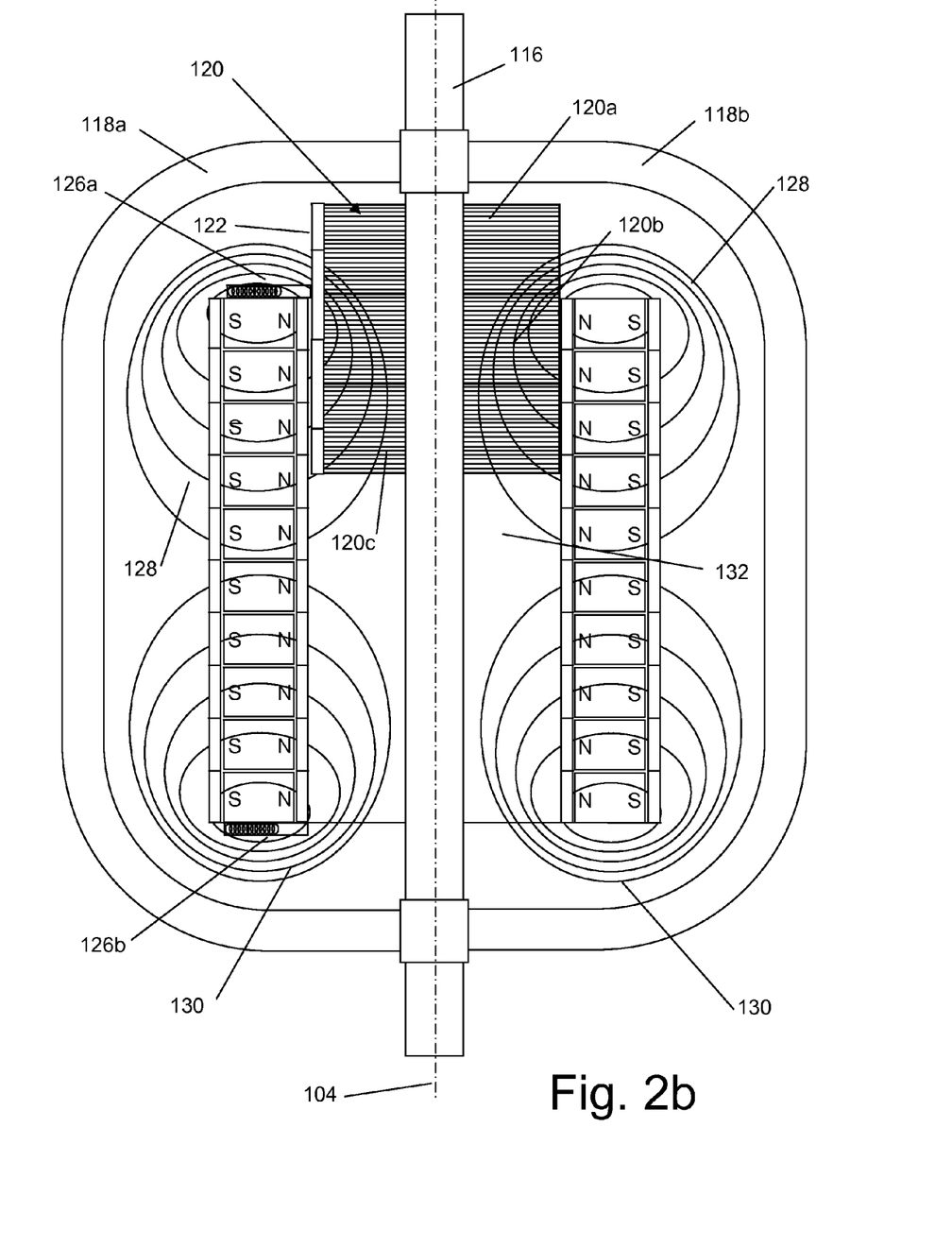
FIG. 2b is a schematic section illustration of the power system of FIG. 1a where a coil assembly is at a first position.
Figure 2C:
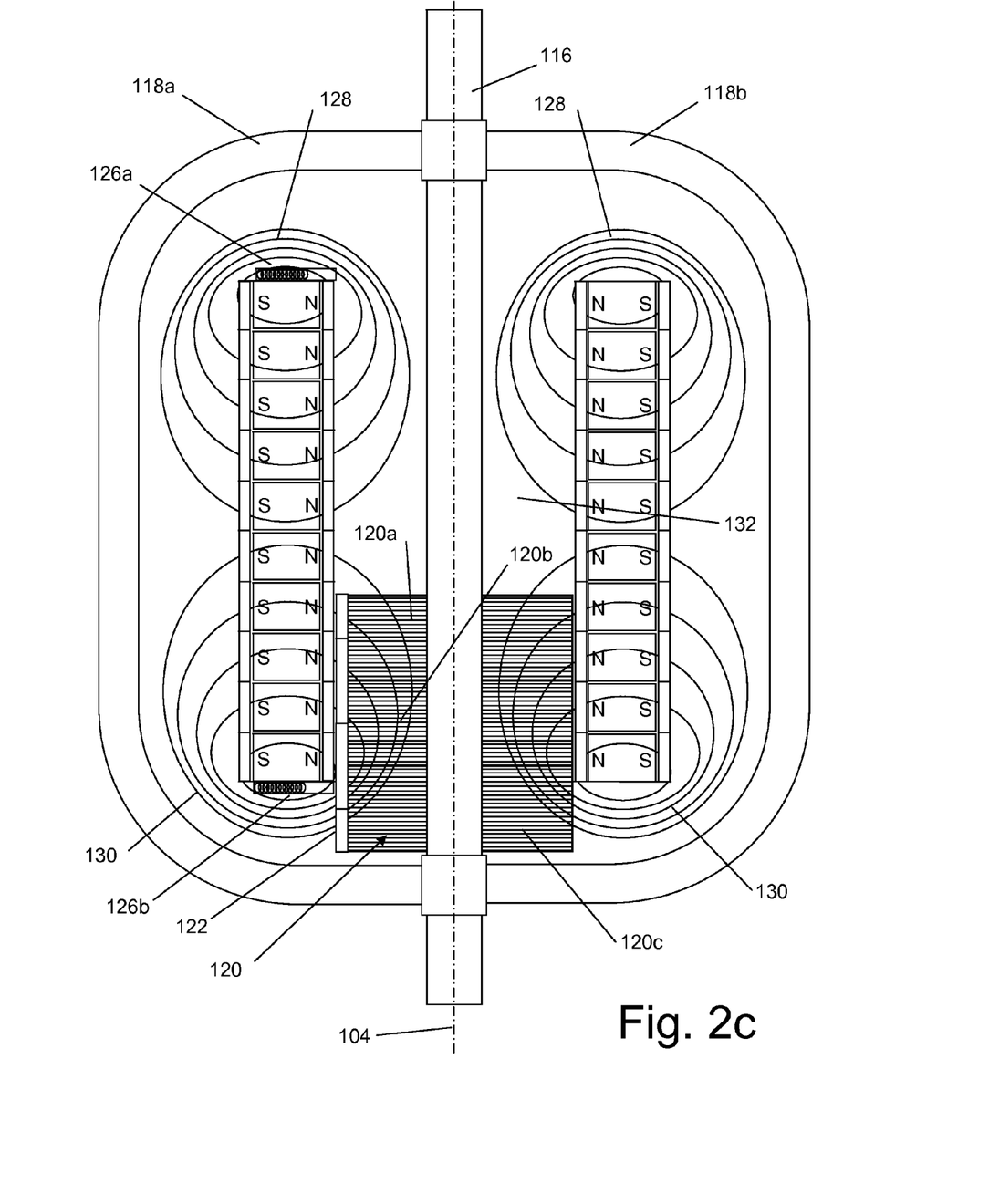
FIG. 2c is a schematic section illustration of the power system of FIG. 1b where the coil assembly is at a second position.

Turning now to FIGS. 2b and 2c, there are schematic illustrations of the power system 100 incorporating the magnetic cylinder 114 of FIG. 2a. As previously discussed in relation to FIG. 1a, there is the core 116, the yolks 118a-118b, and a coil assembly 120. In this example, the core assembly 120 comprises three individual coils 120a, 120b, and 120c. The commutator assembly 122 is positioned on one side of the coil assembly 120. In this embodiment, the brushes 126a and 126b communicate with the coil assembly 120 during a portion of the stroke.

FIG. 2a represents the power system 100 when the coil assembly 120 is in a first position or at the top of the stroke. FIG. 2b represents the power system 100 when the coil assembly is at a second position or the bottom of the stroke.

In certain embodiments, the coil assembly 120 is designed to slidingly move longitudinally along the core 116 between the top of the stroke (FIG. 2b) and the bottom of the stroke (FIG. 2c). In such an embodiment, the core assembly would be coupled to a shaft (not shown) of a power source, such as a wind mill or wave buoy. In other embodiments, the coil assembly 120 is coupled to the core 116 and the core 116 drives the coil assembly 120 between the top of the stroke and the bottom of the stroke. In such an embodiment, the core 116 is coupled to a power source.

When connected to a power source, the coil assembly 120 moves from the top of the stroke to the bottom of the stroke and passes through the first stacked plurality of magnetic flux forces 128 in a center area 132 of the magnetic cylinder 114 to produce electric current in the individual coils. As the coil assembly continues to move towards the second position, the coil assembly passes through the first stacked plurality of magnetic flux forces 128 and enters the magnetic stacked flux forces 130 until it reaches the end of the stroke at the second position represented by FIG. 2c.

As the coil assembly moves from the top of the stroke to the bottom of the stroke, electrical current is generated in the individual coils making up the coil assembly 120. With conventional linear and rotary generating machines the pole face of the magnet must pass directly through the area of maximum magnetic flux. This generates resistive forces commonly known as counter-EMF that directly impinges on this power producing area thus additional energy must be expended overcoming this force. However, in the power system 100, the core 116 acts as a carrier and creates a flux path through the center of the coil. Once the flux path is in the core 116, the yolks 118a and 118b divert and carry the flux forces around the magnetic cylinder 114 and back into the core—completing the path. The magnetic forces are induced on the outside of the coil (where the opposing flux created from current flow is weakest).

The current produced in the coil assembly 120 is then routed along the commutator assembly 122 to the brushes 126a and 126b which are coupled to conductors (not shown) which carry the current out of the system.

In conventional linear generators, designers face a standard design dilemma in that a choice must be made between a magnet stack greater than the stroke length to insure all coils are producing power (which is the most expensive) or a coil stack longer than the magnet length to insure all lines of flux are utilized while the coil is traversing the magnetic stack length. This results in inefficiency because some coils are not utilized at times during the stroke which adds to the overall resistance. In certain embodiments of the present invention, only those coils actively involved with producing power are in the circuit maximizing magnet and coil efficiency.

Additionally, the modular concept of magnetic discs and modular coils enables additional choices in power output configuration during manufacturing by simply stacking components rather than having to design a generating machine for a specific horsepower or other power output.

Various embodiments are disclosed in this application, including: a method of producing an electric current, the method comprising: creating magnetic flux forces generally transverse to a face of a magnet facing a center of a cylinder, moving a coil of wound conductive material partially through the center opening of the cylinder to produce the electric current and, routing resistive forces generated from the moving coil through an iron core, wherein the first coil is positioned concentrically about a first portion of the core, and further routing the resistive forces around the cylinder; further comprising adjusting the longitudinal position of the iron core with respect to the longitudinal axis of the magnetic cylinder to achieve a magnetic and gravitational equilibrium between the magnetic cylinder and the iron core.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The foregoing description of the embodiments of the invention has been presented for the purposes of illustration and description. It is not intended to be exhaustive or to limit the invention to the precise form disclosed. Many combinations, modifications and variations are possible in light of the above teaching. Undescribed embodiments which have interchanged components are still within the scope of the present invention. It is intended that the scope of the invention be limited not by this detailed description, but rather by the claims appended hereto.

The invention claimed is:

1. A method of producing an electric current, the method comprising:
    creating a first stacked plurality of magnetic flux forces about a first portion of a magnetic cylinder such that each magnetic flux force travels between a first pole of an inward face of magnet of the magnetic cylinder, around a first end of the magnetic cylinder, and back to a second pole of an exterior face of the magnet,
    creating a second stacked plurality of magnetic flux forces about a second portion of the magnetic cylinder such that each magnetic flux force travels between a first pole of an inward face of magnet of the magnetic cylinder, around a second end of the magnetic cylinder, and back to a second pole of an exterior face of the magnet,
    moving a first coil partially through the first stacked plurality of magnetic flux forces in a center area of the magnetic cylinder to produce the electric current, and
    routing resistive forces generated from the first coil through an iron core, wherein the first coil is positioned concentrically about a first portion of the iron core and a second portion of the iron core loops around the magnetic cylinder.

2. The method of claim 1, further comprising driving the first coil with the iron core by mechanically coupling the iron core to the first coil such that when the iron core moves, the first coil follows.

3. The method of claim 1, further comprising driving the first coil relative to the iron core such that the first coil slidingly moves relative to the iron core.

4. The method of claim 1, further comprising: routing the electrical current produced in the first coil through a first commutator electrically coupled to the first coil, and routing the electrical current from the commutator to a brush assembly mechanically coupled to the magnetic cylinder.

5. The method of claim 1, further comprising routing the electrical current produced in the first coil outside of the generator through a first conductor electrically coupled to the first coil.

6. The method of claim 1, further comprising: moving the first coil entirely through the first stacked plurality of magnetic flux forces in the center area of the magnetic cylinder to produce the electric current.

7. The method of claim 1, further comprising: moving the first coil partially through the second stacked plurality of magnetic flux forces in the center area of the magnetic cylinder to produce the electric current.

8. The method of claim 1, further comprising: moving the first coil entirely through the second stacked plurality of magnetic flux forces in the center area of the magnetic cylinder to produce the electric current.

9. The method of claim 1, further comprising: moving a second coil partially through the first stacked plurality of magnetic flux forces in a center area of the magnetic cylinder to produce the electric current.

10. The method of claim 1, further comprising: moving the second coil entirely through the first stacked plurality of magnetic flux forces in the center area of the magnetic cylinder to produce the electric current.

11. The method of claim 1, further comprising: moving the second coil partially through the second stacked plurality of magnetic flux forces in the center area of the magnetic cylinder to produce the electric current.

12. The method of claim 1, further comprising: moving the second coil entirely through the second stacked plurality of magnetic flux forces in the center area of the magnetic cylinder to produce the electric current.

13. The method of claim 1, further comprising repeating the steps of:
- moving a first coil through the first stacked plurality of magnetic flux forces in a center area of the magnetic cylinder to produce the electric current,
- moving the first coil entirely through the second stacked plurality of magnetic flux forces in the center area of the magnetic cylinder to produce the electric current, and
- routing resistive forces generated from the first coil through an iron core,
- wherein the first coil is positioned concentrically about a first portion of the iron core and the second portion of the iron core loops around the magnetic cylinder.

* * * * *